United States Patent
Baker

(10) Patent No.: US 7,035,898 B1
(45) Date of Patent: Apr. 25, 2006

(54) SYSTEM FOR PROGRAMMING A FACTORY AUTOMATION DEVICE USING A WEB BROWSER

(75) Inventor: Richard A Baker, West Newbury, MA (US)

(73) Assignee: Schneider Automation Inc., North Andover, MA (US)

( * ) Notice: Subject to any disclaimer, the term of this patent is extended or adjusted under 35 U.S.C. 154(b) by 928 days.

(21) Appl. No.: 09/635,278

(22) Filed: Aug. 9, 2000

Related U.S. Application Data

(63) Continuation-in-part of application No. 09/303,458, filed on Apr. 30, 1999, now Pat. No. 6,151,625, which is a continuation-in-part of application No. 08/927,005, filed on Sep. 10, 1997, now Pat. No. 6,282,454.

(51) Int. Cl.
*G06F 17/00* (2006.01)

(52) U.S. Cl. .................. 709/203; 719/328; 700/83; 700/90

(58) Field of Classification Search ........ 709/200–203, 709/218, 230, 250, 217–9, 221, 227; 700/96, 700/9, 2, 19, 83, 90; 719/328
See application file for complete search history.

(56) References Cited

U.S. PATENT DOCUMENTS

| | | | |
|---|---|---|---|
| 3,971,000 A | 7/1976 | Cromwell | |
| 4,251,858 A | 2/1981 | Cambigue et al. | |
| 4,319,338 A | 3/1982 | Grudowski et al. | |
| 4,688,167 A | 8/1987 | Agarwal | |
| 4,701,845 A | 10/1987 | Andreasen et al. | |
| 4,845,644 A | 7/1989 | Anthias et al. | |
| 4,858,152 A | 8/1989 | Estes | |
| 4,897,777 A | 1/1990 | Janke et al. | |
| 4,912,623 A | 3/1990 | Rantala et al. | |
| 4,937,777 A | 6/1990 | Flood et al. | |
| 4,949,274 A | 8/1990 | Hollander et al. | |
| 4,953,074 A | 8/1990 | Kametani et al. | |
| 4,974,151 A | 11/1990 | Advani et al. | |
| 4,979,107 A | 12/1990 | Advani et al. | |
| 4,992,926 A | 2/1991 | Janke et al. | |
| 5,012,402 A | 4/1991 | Akiyama | |
| 5,023,770 A | 6/1991 | Siverling | |
| 5,047,959 A | 9/1991 | Phillips et al. | |
| 5,072,356 A | 12/1991 | Watt et al. | |
| 5,072,412 A | 12/1991 | Henderson, Jr. et al. | |

(Continued)

FOREIGN PATENT DOCUMENTS

DE  44 10 171 C1  4/1995

(Continued)

OTHER PUBLICATIONS

*Abstract of "Implementing distributed controls for FMC's using Internet utilities," S. S. Jagdale and N. Merchant; Computers of Industrial Engineering, vol. 31, No. 1-2, p. 87-90; Oct., 1996 (UK).

(Continued)

*Primary Examiner*—Krisna Lim

(57) ABSTRACT

A control system for programming an application program controlling a factory automation device on a communication network having a programming device operably connected to the communication network. A program package is embedded in the programming device and is used for creating and editing the application program. At least one web page is resident on the programming device and operably connected to the program package. The web page is accessible to a user using a web browser to edit the application program controlling the factory automation device.

43 Claims, 6 Drawing Sheets

U.S. PATENT DOCUMENTS

| | | | |
|---|---|---|---|
| 5,109,487 | A | 4/1992 | Ohgomori et al. |
| 5,122,948 | A | 6/1992 | Zapolin |
| 5,131,092 | A | 7/1992 | Sackmann et al. |
| 5,134,574 | A | 7/1992 | Beaverstock et al. |
| 5,151,896 | A | 9/1992 | Bowman et al. |
| 5,151,978 | A | 9/1992 | Bronikowski et al. |
| 5,157,595 | A | 10/1992 | Lovrenich |
| 5,159,673 | A | 10/1992 | Sackmann et al. |
| 5,161,211 | A | 11/1992 | Taguchi et al. |
| 5,165,030 | A | 11/1992 | Barker |
| 5,179,700 | A | 1/1993 | Aihara et al. |
| 5,225,974 | A | 7/1993 | Mathews et al. |
| 5,245,704 | A | 9/1993 | Weber et al. |
| 5,251,302 | A | 10/1993 | Weigl et al. |
| 5,283,861 | A | 2/1994 | Dangler et al. |
| 5,297,257 | A | 3/1994 | Struger et al. |
| 5,307,463 | A | 4/1994 | Hyatt et al. |
| 5,321,829 | A | 6/1994 | Zifferer |
| 5,343,469 | A | 8/1994 | Ohshima |
| 5,349,675 | A | 9/1994 | Fitzgerald et al. |
| 5,386,524 | A | 1/1995 | Lary et al. |
| 5,398,336 | A | 3/1995 | Tantry et al. |
| 5,406,473 | A | 4/1995 | Yoshikura et al. |
| 5,420,977 | A | 5/1995 | Sztipanovits et al. |
| 5,430,730 | A | 7/1995 | Sepulveda-Garese et al. |
| 5,440,699 | A | 8/1995 | Farrand et al. |
| 5,446,868 | A | 8/1995 | Gardea et al. |
| 5,471,617 | A | 11/1995 | Farrand et al. |
| 5,528,503 | A | 6/1996 | Moore et al. |
| 5,598,536 | A | 1/1997 | Slaughter, III et al. |
| 5,611,059 | A | 3/1997 | Benton et al. |
| 5,613,115 | A | 3/1997 | Gihl et al. |
| 5,623,652 | A | 4/1997 | Vora et al. |
| 5,625,781 | A | 4/1997 | Cline et al. |
| 5,699,350 | A | 12/1997 | Kraslavsky |
| 5,734,831 | A | 3/1998 | Sanders |
| 5,793,954 | A | 8/1998 | Baker et al. |
| 5,805,442 | A | 9/1998 | Crater et al. |
| 5,862,391 | A | 1/1999 | Salas et al. |
| 5,950,006 | A | 9/1999 | Crater et al. |
| 5,975,737 | A | 11/1999 | Crater et al. |
| 5,982,362 | A | 11/1999 | Crater et al. |
| 5,997,167 | A | 12/1999 | Crater et al. |
| 6,016,523 | A | 1/2000 | Zimmerman et al. |
| 6,028,866 | A | 2/2000 | Engel et al. |
| 6,032,203 | A | 2/2000 | Heidhues |
| 6,038,486 | A * | 3/2000 | Saitoh et al. ............ 700/96 |
| 6,058,251 | A | 5/2000 | Okamoto et al. |
| 6,061,721 | A | 5/2000 | Ismael et al. |
| 6,122,670 | A | 9/2000 | Bennett et al. |
| 6,151,640 | A | 11/2000 | Buda et al. |
| 6,263,487 | B1 | 7/2001 | Stripf et al. |
| 6,268,853 | B1 | 7/2001 | Hoskins et al. |
| 6,510,350 | B1 * | 1/2003 | Steen et al. .............. 700/9 |
| 6,587,884 | B1 * | 7/2003 | Papadopoulos et al. ..... 709/230 |
| 6,788,980 | B1 * | 9/2004 | Johnson ................... 700/1 |
| 6,853,867 | B1 * | 2/2005 | Klindt et al. ............ 700/83 |
| 2004/0210629 | A1 * | 10/2004 | Klindt et al. ........... 709/202 |

FOREIGN PATENT DOCUMENTS

| | | |
|---|---|---|
| DE | 296 00 609 U1 | 3/1997 |
| DE | 196 15 093 A1 | 10/1997 |
| DE | 19615190 A1 | 10/1997 |
| EP | 0 542 657 A1 | 5/1993 |
| EP | 0 814 393 A1 | 12/1997 |
| EP | 0917034 A1 | 5/1999 |
| EP | 0982644 A1 | 3/2000 |
| FR | 2785122 | 4/2000 |
| JP | 60192447 A | 9/1985 |
| JP | 09245705 | 3/1999 |
| WO | WO 97/18636 | 5/1997 |
| WO | WO 98/53581 | 11/1998 |
| WO | WO 01/14963 A1 | 3/2001 |

OTHER PUBLICATIONS

*Abstract of "Process control takes to the Net," G. Paula; Mechanical Engineering, vol. 118, No. 12, p. 55, Dec. 1996.

*Abstract of "Remote interrogation and control of sensors via the internet," Peter L. Furh and Euan F. Mowat; Sensors, vol. 12, No. 12, 6 pp; Dec. 1995.

*Abstract of "Implementation of CAN/CAN bridges in distributed environments and performance analysis of bridged CAN systems using SAE benchmark," H. Ekiz, A. Kutlu and E. T. Powner; Conference Paper, IEEE Southeastern '97, Engineering the new energy, IEEE, p. 185-7, 1996.

*Abstract of "Managing interdisciplinary project teams through the Web," R. E. Goodman and P. Chinowsky; Conference Paper, WebbNet 96—World Conference of the Web Society, pp. 180-185, 1996.

*Abstract of "Learning environment for a process automation system using computer networks," J. Lindfors, L. Yliniemi and K. Leivska; Conference Paper, Step '96—Genes, Nets and Symbols, pp. 137-143, 1996 (Finland).

*Abstract of "Distributed agent systems for intelligent manufacturing," D. H. Norrie and B. R. Gaines; Canadian Artificial Intelligence, No. 40, p. 31-3, Autumn 1996 (Canada).

*Abstract of Proceedings of AUTOFACT 1995 Conference, "Today's Automated, Integrated Factory," Soc. Manuf., Eng., Dearborn, MI; 1995.

*Abstract of "The ECOSSE Control HyperCourse," C. M. Merrick and J. W. Ponton; Computers & Chemical Engineering, vol. 20, Part B, p. S 1353-8, 1996 (UK).

*Abstract of "Chemical-better batch controls," T. Crowl; Control & Instrumentation, vol. 28, No. 5, p. 53-4, May 1996 (UK).

*Abstract of "Industrial software does 32-bit Windows, prepares for the net," W. Labs; I 8CS, vol. 69, No. 3, p. 23-6, 31-4, Mar. 1996, USA.

*Abstract of "A case study for international remote machining;" G. C. I. Lin and Kao Yung-Chou; COnference Paper, Proc. SPIE-Int. Soc. Opt. Eng., vol. 2620, p. 553-60, 1995.

*Abstract of "Standardization of long-distance protocols," R. Dinges; Journal Paper, Generation Changes in Network Conductor Systems, ITG—Fachberichte, vol. 134, p. 97-113, 1995 (West Germany).

*Abstract of "Control system design V. Communications orchestrate process control," F. Glow; In Tech, vol. 36, No. 9, p. 68-74, Sep. 1989.

*Abstract of "Functions and characteristics of local networks adapted to industrial applications," J. Morlais; Electronique Industrielle, No. 97, p. 56-63, Nov. 15, 1985; France.

*Abstract of "Intelligent supervisory control of submerged-arc furnaces," Markus A. Reuter, Carla Pretorius, Chloe West, Peter Dixon and Morne Oosthuizen, JOM vol. 48, No. 12, Dec. 1996, p. 49-51.

*Abstract of "Simulation on the integration of process control systems of rolling mill plants through standard networks," Choo Young Yeol, Hwang Hwa Won and Kim Cheeha, Proceedings of the Industrial Computing Conference, Instrument Society of America, Research Triangle Park, NC, USA. P 1-14; vol. 6, No. 1, 1996.

*Abstract of "Environmental waste control digest," Clayton H. Billings; Public Works vol. 127 No. 7, 6 pp, Jun. 1996.
*Abstract of "Experiments in tele-handling and tele-machining at the macro and micro scales, using the Internet for operational environment transmission," Mamoru Mitsuishi, Toshio Hori, Tomoharu Hikita, Masao Teratani, Takuro Watanabe, Hirofumi Nakanishi and Bruce Kramer; IEEE International Conference on Intelligent Robots and Systems vol. 2, 1995.
*Abstract of "A phototyping and reverse engineering system for mechanical parts-on-demand on the national network," Fred Hansen, Elias Pavlakos, Eric Hoffman, Takeo Kanade, Raj Reddy, Paul Wright; Journal of Manufacturing Systems, vol. 12 No. 4, p. 269-281; 1993.
*Abstract of "Mathematical model and optimization of furfural treating process," Tao Peng, Jinshou Yu and Huihe Shao; Huadong Huagong Xueyuan Xuebao/Journal of East China Institute of Chemical Technology vol. 17 No. 1, p. 99-104; Feb. 1991.
*Abstract of User's Aspect of Telecommunication and Information Processing in Plant Factory; Hashimoto Yasushi (1); Journal of the Institute of Electronics, Information and Communication Engineers, vol. 78, No. 5, p. 475-81, Fig. 3, Ref. 7, 1995. (Japan).
*Abstract of "High-efficient application technology of DCS from the viewpoint of users," Oka Norihito (1); Narita Tsutomu (1); (1) Yamatake-Honeywell Co., Ltd.; Otomeshon, vol. 40, No. 2, p. 24-28, Fig. 5, Part 2, 1995. (Japan).
*Abstract of "Users' experience with software tools for process integration. General results" Stougie, L.; Roeterink, H.J.H.; Van Wijk, A.; Stikkelman, R.M.; Nov. 1996.
*Abstract of "Integrated design and process technology. vol. 1" Cooke, D.J.; Kraemer, B.J.; Sheu, P.C.Y.; Tsai, J.P.; Mittermeir, R.; Society for Design and Process Science, p. 51-57; 1996. (USA).
*Abstract of "Integrated design and process technology. vol. 2" Tanik, M.M.; Bastani, F.B.; Gibson, D.; Fielding, P.J.; Society for Design and Process Science, p. 423-430, 1996. (USA).
*Abstract of "Integrated design and process technology. vol. 2" Tanik, M.M.; Bastani, F.B.; Gibson, D.; Fielding, P.J.; Society for Design and Process Science, p. 306-312, 1996.
*Abstract of "Need low-cost networking consider DeviceNet," W. H. Moss; InTech vol. 43:11; p. 30-31, Nov. 1996.
*"Plastic Car Bodies Pass the Crash Test," mechanical engineering vol. 118, No. 12; Dec. 1996.
*http://www.adeptscience.com/archive_pressroom/html/labtechnet.html; Adapt PressRoom Archives. A collection of Adept Scientific's archive news releases. "Hot Coffee on the Internet!".
*When Technology Standards Become Counterproductive, Kenneth C. Crater, President, Control Technology Corporation, Hopkinton, MA dated Jul. 9, 1999, pp. 1-5.
*A White Paper State Language for Machine Control, Kenneth C. Crater, President, Control Technology Corporation, Hopkinton, MA dated Jul. 9, 1999, pp. 1-11.
*New PC-based Process Control & Data Acquisition Software Integrates Remote Internet Capabilities with Fast Pentium Support, Fred A. Putnam, LABTECH President, pp. 1-3.
*Aug. 1996 CONTROL Magazine—In The News B Electric Utility Industry Embarks on Automation Overhaul, pp. 1-10.
*Jul. 1997 CONTROL Magazine B Magazine Software Review B NT Package Give Plant Access Through the Web, pp. 1-3.
*Oct. 1996 CONTROL Magazine B Software Review—Article Archives, pp. 1-2.
*ICS Instrumentation & Control Systems B Windows NT for real-time control: Which way to go?—ICS Magazine, pp. 1-8.
*I&CS Jul. 1999—Special Report Software—Software: Open source OSs, objects, Web-based communications challenge status quo, (Wayne Labs, Senior Technical Editor), pp. 24-49.
*Landis & Staefa MS 2000, pp. 1-2.
*Landis & Staefa Standards and Open Protocols Integration System Architecture, p. 1.
*Annabooks Bookstore, Programming and Interfacing the 8051, by Sencer Yeralan and Asutosh Ahluwalia, pp. 1-2.
*SoftPLC Corporation—Java Support in SoftPLC Corp. Products, pp. 1-5.
*Mach J. Company, MachJ, an embeddable, clean room Java Virtual Machine, p. 1.
*SoftPLC Corporation—The History of Programmable Controllers, Looking Back From the Year 2000 A.D. (Or, How Computers Replaced Proprietary PLC'S), pp. 1-7.
*SoftPLC Corporation—TOPDOC: Advanced PLC program development & documentation software, pp. 1-12.
*Control Engineering Online Magazine Articles (Jul. 1998)—No, that's not a PC, it's a PLC, pp. 1-2.
*Rockwell International Corporation, Allen-Bradley Introduces PLC-5/80E Controller for Ethernet Communication Networks, pp. 1-2.
*Rockwell Automation—Search Results, pp. 1-2.
*Rockwell International Corporation, Vision & Direction, The Direction of Automation Systems, pp. 1-4.
*Rockwell International Corporation, Vision & Direction, The Role of Open Systems, The Role of Open Systems, pp. 1-4.
*Rockwell International Corporation—Vision & Direction—The Direction of Automation Systems—Emergence of Application-Specific Control Solutions, pp. 1-2.
*Rockwell International Corporation—Vision & Direction—The Direction of Automation Systems—The New Factory Worker, pp. 1-2.
*Rockwell International Corporation, Vision & Direction, Control System Deliverables—The Next Step, pp. 1-2.
*Rockwell International Corporation, Vision & Direction, Conclusion & Acknowledgments, pp. 1-2.
*Rockwell International Corporation—Choices—Perspectives on the Future of Automation Control, p. 1.
*Rockwell International Corporation—Allen-Bradley—Networks—Ethernet for Industrial Control—An Ethernet White Paper—Apr. 21, 1998, pp. 1-13.
*Rockwell International Corporation—Automation Systems Control—General—World-Class Automation Systems from Allen-Bradley, Last Updated: May 7, 1998, pp. 1-12.
*PC QUEST, Dec <97—Point, click, Control—C-Programmable controllers take the pain out of embedded control, pp. 1-2.
*Berthel—automation with imagination—PCI 100—Programmable logic controller for SIMATIC/IBM IPC, pp. 1-3.
*YAHOO! Personalized Search Results for programmable logic controller internet access, pp. 1-3.

*Siemens—SIMATIC report Jan. 1997—New in the SIMATIC Library, pp. 1-2.
*CONTROL Magazine Aug. 1998 B Field Test—Dynamic Software Makes Control Integration Easier, pp. 1-2.
*Design and Reuse Web Site—EDTN Network—Analyze IP Database Content—Analyze Reuse Blocks per taxonomy tree, pp. 1-10.
*Engineering Information, Inc.—Ei CPX WEB [1990-94].
*Using World Wide Web for Control Systems, F. Momal, C. Pinto-Pereira, AT Division CERN, 1211 Geneva 23, http://mish231.cern.ch/Docs/ICALEPCS/1995/icalep95.htm.
*"Ethernet Base Gateway Product," AEG-Modicon, published 1991.
*"Modicon Modbus Plus Network BM85 Bridge Multiplexer User's Guide," Groupe Schneider, Aug. 1995.
*"Modicon Modbus Plus Network Planning and Installation Guide," AEG Schneider Automation, Apr. 1996.
*"Open Modbus/TCP Specification," A. Swales, Sep. 3, 1997.
*"MEB Installation and Programming Manual," Niobrara Research and Development Corporation, Sep. 24, 1997.
*"MEB-TCP Installation and Programming Manual," Niobrara Research and Development Corporation, Oct. 1, 1997.
*"Internet Protocol, Darpa Internet Program, Protocol Specification—RFC:791," Defense Advanced Research Projects Agency, Sep. 1981.
*"Transmission Control Protocol, Darpa Internet Program, Protocol Specification—RFC:793," Defense Advanced Research Projects Agency, Sep. 1981.
*"[comp.unix.programmer] Unix-Socket-FAQ For Network Programming," Vic Metcalfe, Andrew Gierth and other contributors, Jan. 22, 1998.
*"TCP/IP Illustrated, vol. 2, The Implementation," Gary R. Wright, W. Richard Stevens, 1997.
*"Winsock 2 Information," Bob Quinn, 1995-1998 (last updated Dec. 5, 1998).
*Website Information of PROFIBUS: Technical Overview.
*Website Information of ODVA—The Open DeviceNet's Vendor Association.
*Website of PROFIBUS International—Welcome Page.
*LabVIEW Graphical Programming for Instrumentation, Networking Reference Manual, 8 Copyright 1993, 1994 National Instruments Corporation, Part No. 320587B-01, Sep. 1994.
*LabVIEW Graphical Programming for Instrumentation, Tutorial for Windows, 8 Copyright 1993, 1994 National Instruments Corporation, Part No. 320593B-01, Sep. 1994.
*LabVIEW Graphical Programming for Instrumentation, Data Acquisition VI Reference.
Manual for Windows, 8 Copyright 1992, 1994 National Instruments Corporation, Part No. 320536B-01, Sep. 1994.
RFC 1533 "DHCP Options and BOOTP Vendor Extensions," (http://ietf.org/rfc/rfc1533.txt) IETF, Oct. 1993.
RFC 1534 "Interoperation between DHCP and BOOTP," (http://ietf.org/rfc/rfc1534.txt) IETF, Oct. 1993.
RFC 2131 "Dynamic Host configuration Protocol," (http://ietf.org/rfc/rfc21231.txt) IETF, Mar. 1997.
SOAP, Simple Object Access Protocol (1.1) W3C Note May 8, 2000, (http://www.w3.org/TR/2000/NOTE-SOAP-2000508).
*Statement of Ken Crater pertaining to awareness of LABTECHnet technology, 1 page.
SOAP, [online], [retrieved on Aug. 5, 2002]. Retrieved from MSDN Online—Default Home Page using Internet <URL: http://msdn.microsoft.com/nhp/ default.asp?contentid=28000523&frame=true>.
PROCOMM Plus—The Leader in terminal emulation, [online], [retrieved on Jan. 13, 2002]. Retrieved from the consumer web page of Symantec, Inc. using Internet <URL: http://www.symantec.com/procomm>.
DEC Terminals—The DEC VT100 and Its Successors, [online], 1999 Richard Shuford, [retrieved on Jan. 13, 2002]. Retrieved from DEC Video Terminals—The VT100 and Its Successors using Internet <URL:http: //www.cs.utk.edu/~shuford/terminal/dec.html>.
NetReachJ Model TPS-2, TelnetPower Switch 2001, [online], [retrieved on Jan. 13, 2002]. Retrieved from Model TPS-2 Telnet+Dial-Up Remote Power Manager, Remote Reboot of Servers, Route . . . using Internet <URL:http://www.wti.com/tps2.htm>.
ANSI.SYS, [online], [retrieved on Jan. 13, 2002]. Retrieved from ANSI.SYS B ansi terminal emulation escape sequences using Internet URL:http://enterprise.aacc.cc.md.us/~rhs/ansi.html>.
Skonnard, Aaron, SOAP: The Simple Object Access Protocol, @ [online], [retrieved on Jul. 30, 2002]. Retrieved from SOAP: The Simple Object Access Protocol—MIND Jan. 2000 using Internet <URL: http://www.microsoft.com/Mind/0100/soap/soap.asp>.
Extensible Markup language (XML)—W3C Working Draft 07-Aug. 1997, [online], [retrieved on Aug. 1, 2002]. Retrieved from Extensible Markup Language (XML) website using Internet <URL:http://www.w3.org/TR/WD-xml-970807.htm>.
Multi-Tech Systems Granted Modem Firmware Upgrade Patent, Apr. 5, 2000, [online], [retrieved on Jan. 3, 2002]. Retrieved from Multi-Tech Press Release using Internet <URL:http://www.multitech.com/NEWS/releases/2000/183.html>.
Remote Interrogation and Control of Sensors via the Internet, Sensors and Systems; Peter L. Fuhr and Euan F. Mowat; University of Vermont; pp. 25-30; Dec. 1999.
Walid Mostafa, Mukesh Singhal, "*A Taxonomy of Multicast Protocols For Internet Applications,*" Jul. 18, 1997 from Computer Communications 20 (1998) 1448-1457.
Tilo Klesper, *"Der Internet-Zugriff aufs LON,"* Aug. 1998 from Automatisieren.
David J. Preston, *"Internet Protocols Migrate to Silicon For Networking Devices"* from Electronic Design, Apr. 14, 1997.
IEEE Std 802.11a-1999 (Supplement to IEEE Std 802.11-1999) "Part 11: Wireless LAN Medium Access Control (MAC) and Physical Layer (PHY) specifications Higher-speed Physical Layer in the 5 GHz Band" [Adopted by ISO/IEC and redesignated as ISO/IEC 8802-11:1999/Amd 1:2000(E)].
P802.1p/D4 Sep. 6, 1966 "P802.1p Standard for Local and Metropolitan Area Networks—Supplemental to Media Access Control (MAC) Bridges: Traffic Class Expediting and Dynamic Multicast Filtering".
Communication from the European Patent Office dated Aug. 11, 2001, submitting the international search report for International Publication No. WO 01/69335 A3; PCT/US01/05564.

Quinnell, R.A., "Web Servers in Embedded Systems Enhance User Interaction," *EDN Electrical Design News*, Apr. 10, 1997, pp. 61-64, 66, 68.

Kubota, Y, et al., NTT Human Interface Laboratories, "Proposal of the Robot System With Information Sending Mechanism," Presented at the 14th Annual Conference of the Robotics Society of Japan, Nov. 1-3, 1996, pp. 341-342. (In Japanese w/ English translation included).

Brugger, Peter, "Web Technology in Embedded Computing," *Industrial Computer 97—Special Edition*; Sep. 3, 1997 (in German w/ English translation included).

Williams, Tom, et al., "Java Goes to Work Controlling Networked Embedded Systems," *Computer Design*, Aug. 1996, pp. 36.

Fu, K.S., et al., *Robotics: Control, Sensing, Vision and Intelligence*, Chapter Five: Control of Robot Manipulators; Sections 5.1-5.3.1.

*Automation Strategies,* by Automation Research Corporation, Feb. 1998, pp. 1-32.

* cited by examiner

SYSTEM FOR PROGRAMMING A FACTORY AUTOMATION DEVICE USING A WEB BROWSER

RELATED APPLICATIONS

This application is a continuation-in-part of U.S. patent application Ser. No. 09/303,458, filed Apr. 30, 1999 now U.S. Pat. No. 6,151,625, which is a continuation-in-part of U.S. patent application Ser. No. 08/927,005, filed Sep. 10, 1997 now U.S. Pat. No. 6,282,454. This application is also related to the following, commonly assigned application, entitled "Apparatus for Controlling Internetwork Communications," U.S. patent application Ser. No. 08/926,837. The contents of these Applications are expressly incorporated herein by reference.

TECHNICAL FIELD

Applicants' invention relates generally to the field of factory automation devices and more particularly to a system for coupling a network of factory automation devices through an internetwork to a monitoring and control device.

BACKGROUND OF THE INVENTION

Remote monitoring and control of systems and processes have taken many forms. In the past, dedicated lines became the most common forms of communication between a control system and a remote location. This has limited application since the control system was not accessible from multiple locations. Modems have made it possible to access the control system from different locations, but these types of systems are generally restricted to downloading and uploading data files. Providing any type of control function between locations is rather limited in this type of environment. Further, an end user generally requires a customized interface to access the control system.

With the growth of the Internet, and its World Wide Web providing a delivery platform for organizing Internet data through hypertext links, a client server system can be designed that will provide each end user the same type of a user friendly interface with the same universal access to services on the Web. The Web is a network of documents called sites or pages stored on server computers throughout the world. Each page will usually contain text, some type of multimedia offerings such as graphic images, video, or audio, and possible hypertext links to other documents. A browser allows a user to view the pages and interact with the choices associated with it. The browser is a graphical software program that sends commands to the Internet Web site and displays whatever information is available on the page. Various browser programs are commercially available from different manufacturers.

The Internet network employs methods designed to handle thousands of general purpose computers sharing a single cable and therefore has no ability to differentiate traffic in terms of its purpose or the criticality of its data. The Internet is no longer a network of computers sharing a single cable, but rather a web of interconnected point to point links involving both general purpose stations and specialized infrastructure components such as routers and firewalls.

The type of network device used by the end user to connect to the Web is of no regard, i.e., personal computer, work station, PDA, cell phone, etc. Communication over the Internet and other networks requires one of several types of protocols. Protocols such as Internet Protocol (IP) provide for file transfers, electronic mail, and other services. A Sun Microsystem programming language known as Java, along with Hypertext Markup Language (HTML) used in designing layouts and graphics for a Web site or page have extended Internet technology such that a web site can be used for dynamic applications, commonly called applets, that can be downloaded and run by the end user. These applets are interpreted and run within a Web browser and have been generally restricted to word processing and similar uses. Downloading and running applets can be slow in comparison to other types of compiled languages. Security rules imposed on a browser and enforced by the underlying Java language prevent applets from obtaining certain data from any other device other than the Web server itself.

Factory automation devices such as programmable logic controllers (PLCs) and IO modules are widely used in industry and process control. Many manufacturers provide factory automation information using Microsoft Windows and other types of communication networking environments. These networks are usually slow, are not universally accessible and are limited to monitoring and data exchange. Control may be implemented, but since the communication networks are non-deterministic, control is not real time. Specialized industrial networks using proprietary fieldbus alternatives can be very expensive. Conversion products are required to allow information carried over those networks to be visible on a general purpose network. There are significant installation and other deployment costs associated with the existence of such intermediate devices. Firewalls between the Web server and the application are designed to solve problems of security and are not designed for high performance.

Programming a factory automation device, such as a programmable logic controller (PLC), in these environments has many shortcomings. With a variety of PLCs available in an integrated control system, making changes or updates may be difficult and expensive. The program package uses valuable memory within the PLC that can be more effectively utilized in other areas. Sharing of PLC resources to create and edit programs run on the PLC can diminish the PLC's capability and utility.

It would be desirable to develop an automation control system whereby a user could use general, commercial networks such as the Internet, in place of specialized industrial networks to remotely edit new and existing factory automation control devices such as PLCs.

SUMMARY OF THE INVENTION

An object of the present invention includes a system for programming an application program controlling a factory automation device on a communication network. The system for programming the factory automation device comprises a programming device operably connected to the communication network. A program package resident in the programming device is used for creating and editing the application program. At least one web page resides on the programming device and is operably connected to the program package. The web page is accessible to a user using a web browser to edit the application program controlling the factory automation device.

A further object of the present invention is to provide remote programmability of a factory automation device contained in an industrial control system. Updates to the operating software of the factory automation device can also be transferred through the Internet access. Residing in a programming device is a program package accessible to a user on the Internet. The user can edit programs controlling the operation of the factory automation device. The factory automation device's operating software can be transferred to the programming device from a remote location or from the programming device to the factory automation device.

Yet another object of the invention allows for easy access over a commercial network such as the Internet to a device for programming an application program of a factory automation device, preferably a programmable logic controller (PLC). Access can be made locally or worldwide using a commercial Web browser. The invention is comprised of a control system of essential elements including, but not limited to a Web interface, a local network, and a network interface to at least one PLC control system running an application program for controlling output devices in response to status of input devices. The Web interface runs Web pages from an Ethernet board coupled directly to the programming device and includes a hypertext transfer protocol (HTTP) interpreter, a programming device driver, a Transmission Control Protocol/Internet Protocol (TCP/IP) stack, and an Ethernet board kernel. The Web interface provides access to the programming device by a user at a remote location through the Internet. The interface translates the industry standard Ethernet, TCP/IP and HTTP protocols used on the Internet into data recognizable to the programming device. Using this interface, the user can retrieve all pertinent programming data regarding the operation of the PLC, including PLC configuration, Input/Output (I/O), registers, operating statistics, diagnostics, and distributed I/O configurations.

Another object of the present invention is to provide an interface between a programming device and an industrial control system coupled to a network such as the Internet.

Another object of the present invention is to provide remote access through a web browser to operating program information and data contained in an industrial control system having a factory automation device.

Other features and advantages of the invention, which are believed to be novel and nonobvious, will be apparent from the following specification taken in conjunction with the accompanying drawings in which there is shown a preferred embodiment of the invention. Reference is made to the claims for interpreting the full scope of the invention which is not necessarily represented by such embodiment.

DETAILED DESCRIPTION

Although this invention is susceptible to embodiments of many different forms, a preferred embodiment will be described and illustrated in detail herein. The present disclosure exemplifies the principles of the invention and is not to be considered a limit to the broader aspects of the invention to the particular embodiment as described.

Figure 1:
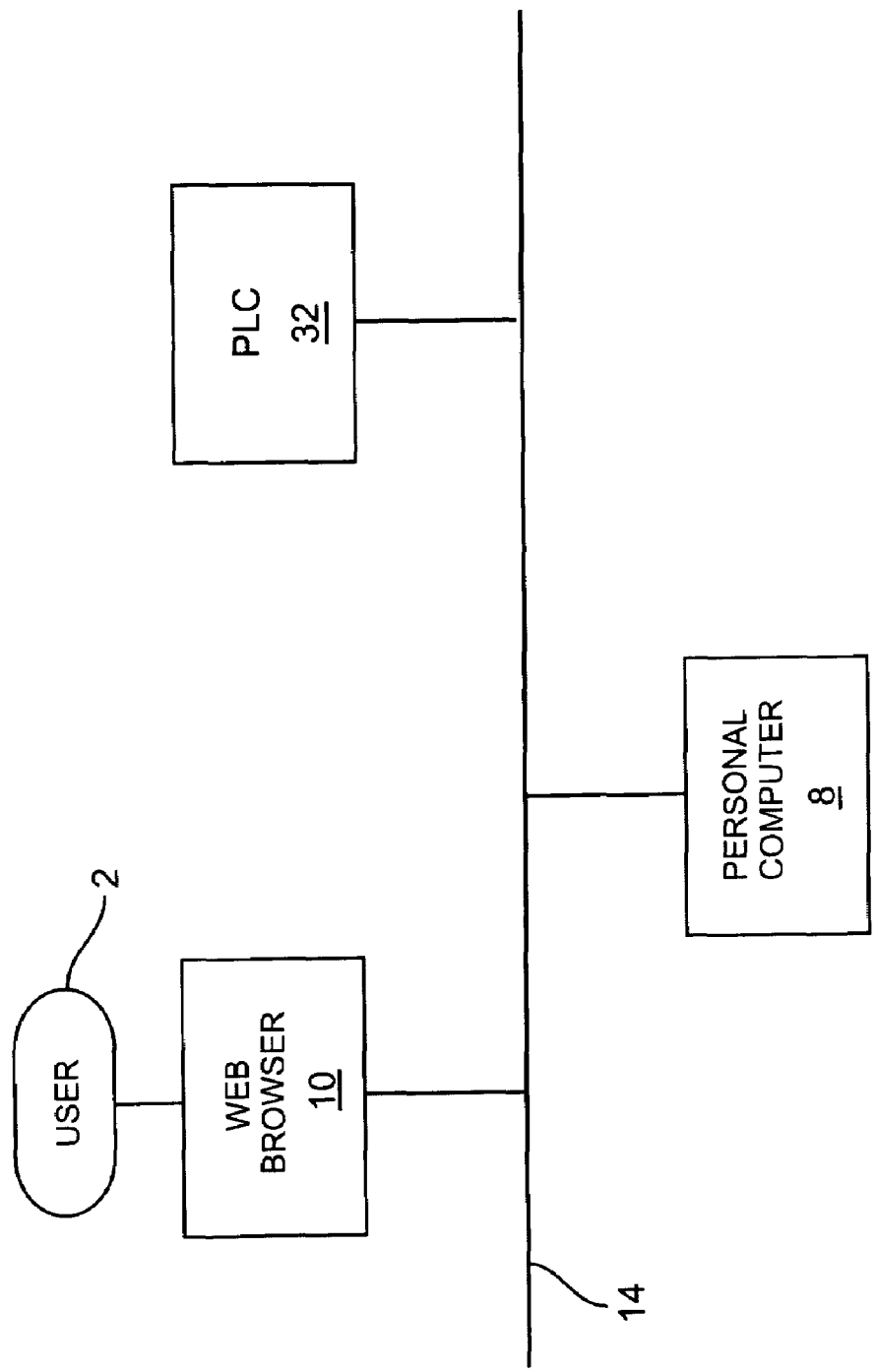
FIG. 1 shows the a control network according to the present invention.

FIG. 1 shows an overview block-diagram of a system illustrating the relationship between a user 2 at a remote location interfacing with a web browser 10 and personal computer 8 used for programming an application software of a factory automation device, preferably a PLC 32.

Figure 2:
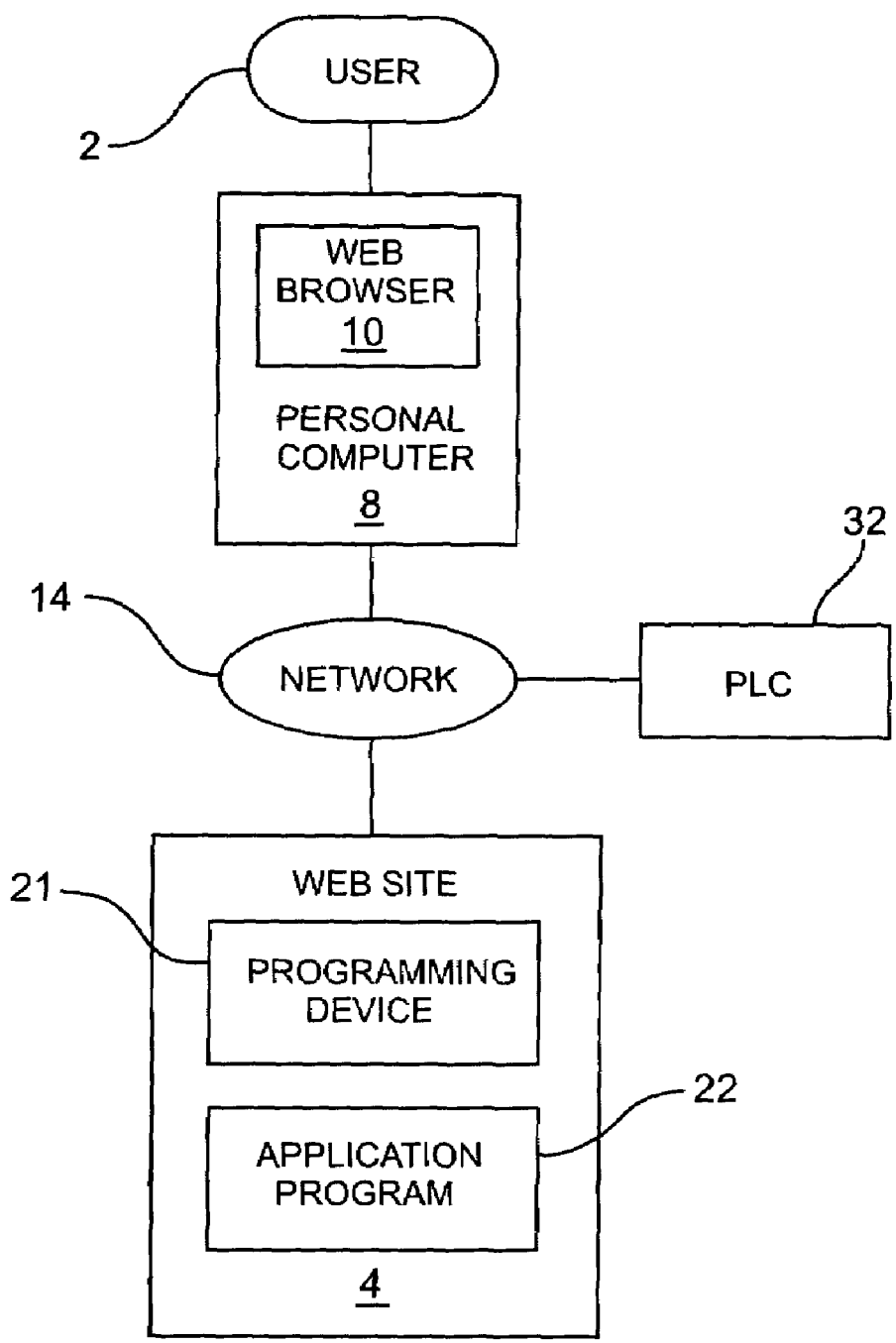
FIG. 2 shows an overview block diagram of a control system illustrating the relationship between a user at a remote location and an Internet Web site used for editing an operating program for a factory automation device operably connected to process control system according to the present invention.

FIG. 2 shows a block diagram of the relationship between the User 2, and the web browser 10 that is running on a personal computer 8. This personal computer 8 is connected to a network 14. The network is also connected to the PLC 32 and to a web site 4. The web site 4 contains the application program 22 for operating the PLC 32 and the programming device 21 for editing the application program 22.

Figure 3:
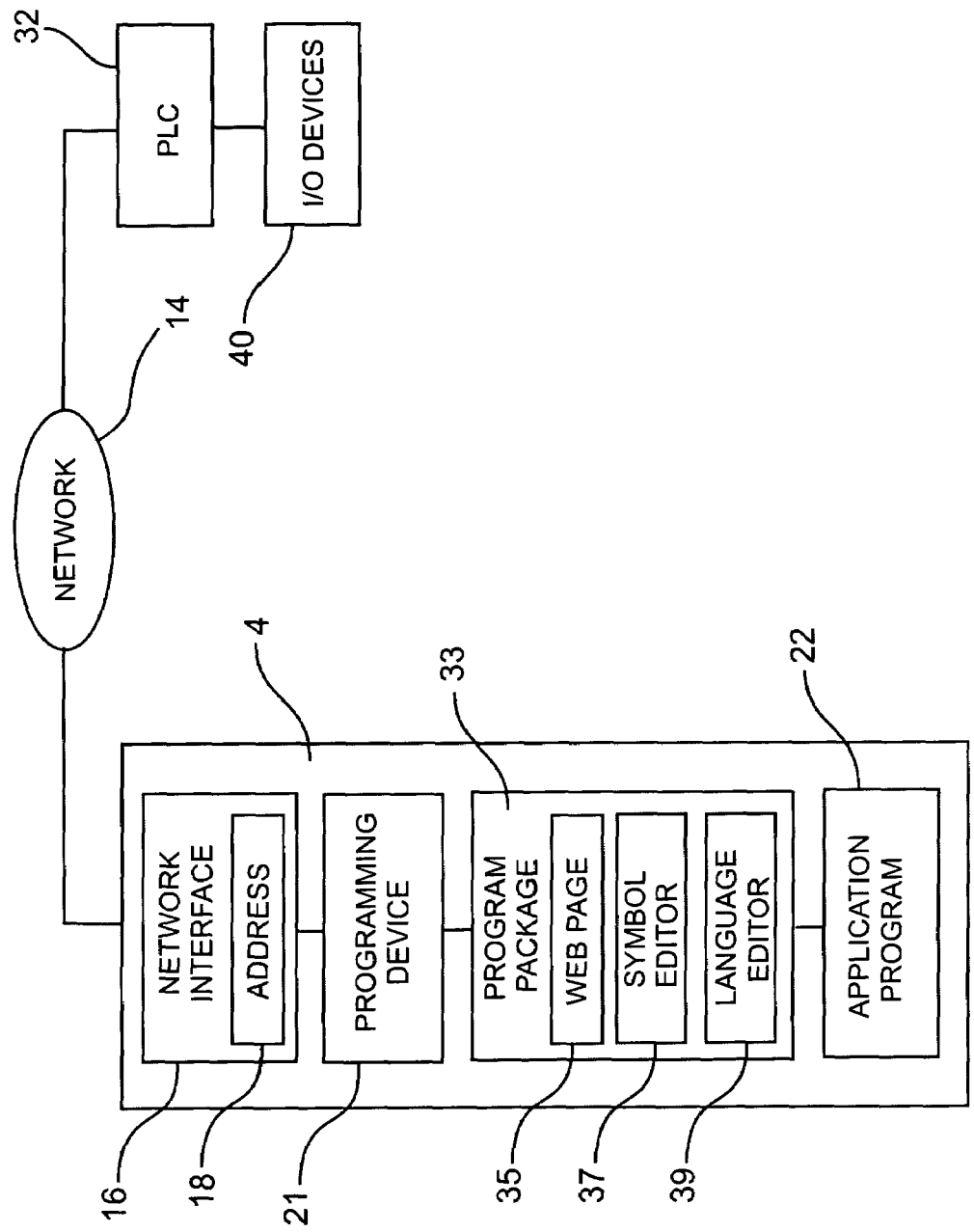
FIG. 3 is a basic block diagram of the present invention illustrating a programming device and a factory automation device operably connected to a network.

FIG. 3 shows the relationship of the web site 4 to the PLC 32. In this figure, the PLC 32 is connected to I/O devices 40 and to the network 14. Also connected to the network 14 is the web site 4. The web site 4 includes a network interface 16 that has an address 18. The web site also includes a programming device 21, a program package 33, and an application program 22. The program package 33 includes web pages 35, a symbol editor 37 and a language editor 39.

Figure 4:
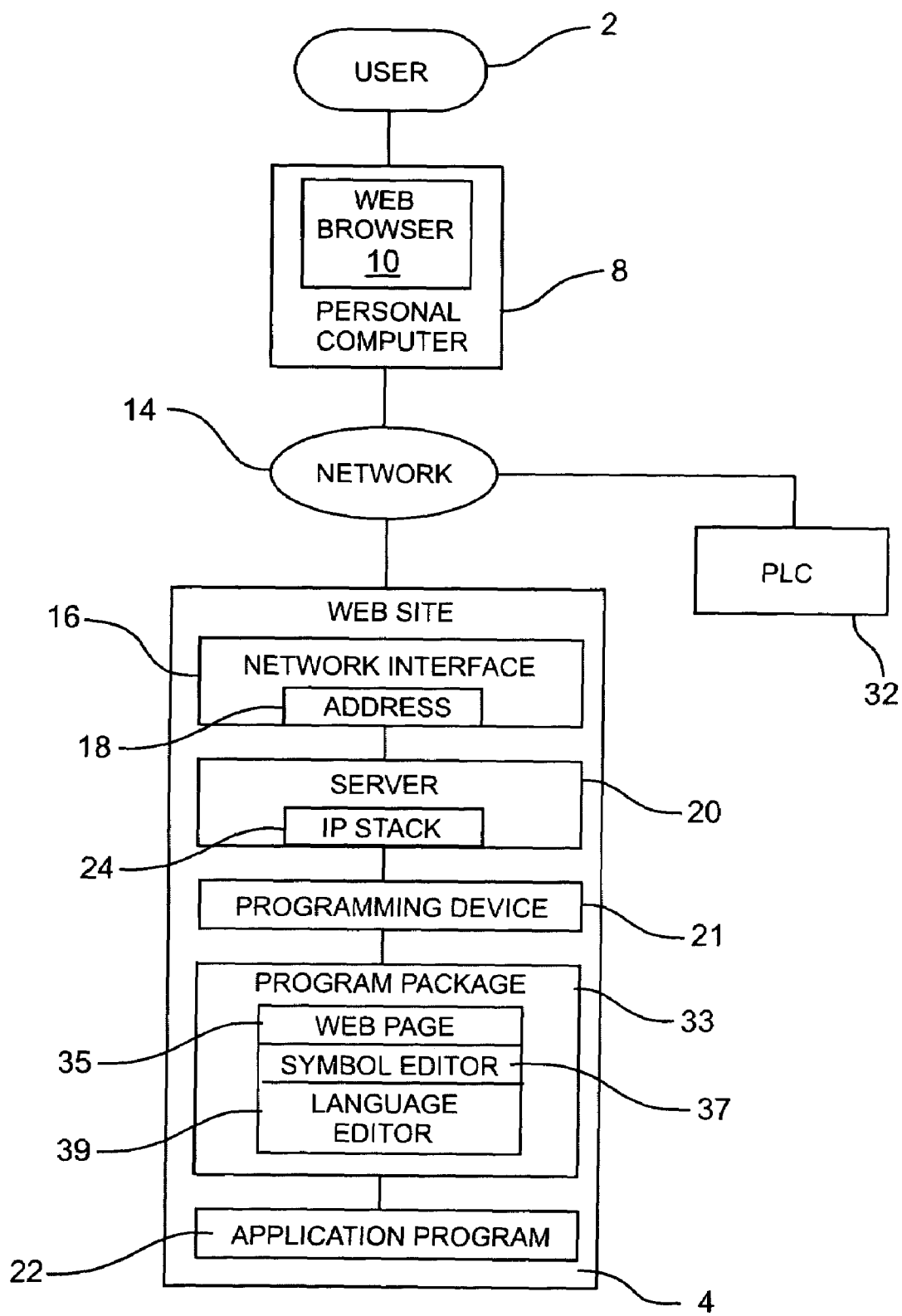
FIG. 4 is a block diagram of the Web server module illustrated in FIG. 2.

In FIG. 4, the user 2 will have a programming device 21, preferably a personal computer (PC) 8, having a commercially available browser 10, such as Netscape Communication's Navigator or Microsoft's Internet Explorer, installed for viewing the contents at the web site 4 through a network 14, such as the Internet. The PC 8 provides a remote human-machine interface (HMI) to the communication network 14 and the devices operably connected on the network. Various interconnection services are readily available to provide the physical and electrical interconnection from the PC 8 to the Internet 14. The Internet 14 is a collection of independent world wide communication networks that are interconnected to each other and function as a single connectionless entity. Communication is based on a client-server basis, using a number of established protocols that allow for communication and file transfers between the client and the server. The most widely used protocol is Internet Protocol (IP).

The web site 4 includes a network interface 16 having an unique Internet address 18, a server 20, and an application program 22. The server 20 acts as a hypertext transfer protocol (HTTP) interpreter which uses Transmission Control Protocol (TCP) in conjunction with Internet Protocol, through a Transmission Control Protocol/Internet Protocol (TCP/IP) stack 24 to interact with the network interface 16 and the application program 22. This enables the transfer of the application program 22 to the PLC 32 through the internet 14. The application program 22 provides an operating program to the PLC 32. The PLC 32 operating program can be created or edited remotely from the PLC and then transmitted to the PLC for use in the communication network when desired. The TCP/IP stack 24 enables data transfers over the Internet 14 between the user 2 and the web site 4 as required for the various layers specified by the IP protocol.

The user 2 can connect to the Internet 14 using one of a number of Internet service providers and will enter the address of the web site 4 when connected. The web site 4 will display a home page which may contain text, some type of multimedia offerings such as graphic images, video, or audio, and possible hypertext links to other documents. The browser 10 will allow the user 2 to view the page and interact with the choices associated with it. The browser 10 will send commands to the web site 4 which will use the application program 22 to display whatever information is available from the PLC's operating program. The browser 10 functions as a remote human-machine interface (HMI) with the communication network and PLC's operating program.

FIG. 4 shows a basic block diagram of the present invention illustrating an Internet interface to a communication network having a PLC 32 and a programming device 21. The web site 4 includes the network interface 16 having an unique Internet address 18 and a web server 30. The web server 30 provides the home page for the website 4. A firewall or security for the overall system can be included in the web server 30, but is generally maintained as part of the network interface 16. In addition to providing security for various pages at the site, the user can disable the web server 30. A password and user list is provided in initial configuration files stored in the web server 30 that are downloaded from a remote server. Protection of the configuration file is then provided by the remote server and the web server 30 through the password and the user list. The web server 30 provides a direct connection for a programming device 21 to the Internet. The web server 30 provides both a client and server interface. All signals between the programming device 21 and the web server 30 can be through the network 34. The communication signals include addressing, control, data, and power. The client interface allows a user to send commands to a remote node over the Internet and the server interface allows for processing commands that originated from a remote node. Creating and editing the PLC operating program from a remote HMI is possible without involving the resources associated with the PLC 32.

Associated with the PLC 32 are its application programs 22, programming device 21 and Input/Output (I/O) modules 40. The application programs 22 include a ladder logic program for controlling the I/O modules 40 of the network. The web server 30 functions as a node on a TCP/IP network 14 allowing it to send data and commands to a device on the network and receive the response. Although the TCP/IP network 14 in the preferred embodiment is an Ethernet network, other high level protocols could be used. Using a web browser at a remote location through the Internet, a user can view and edit the PLC's operating program.

A program package 33, using either Java or HTML, resides within a programming device 21. The programming device 21 is operably connected to the network and can be physically placed near or far from the PLC 32. The program package 33 is based on Ethernet and Web technology and allows editing of the application program 22 by the user using a programming device 21, preferably a personal computer 8. The application programs 22, stored as either a ladder logic or an IEC 1131 language program, are viewed and saved as PLC programs within the programming device 21, accessible using either the standard HTTP or custom PLC protocols that run over TCP/IP. The information needed to edit the operating program, including web pages for the editing procedures, reside in the programming device 21, preferably the program package 33. The program package 33 converts the PLC operating programs to and from formats needed for editing with a browser 10. The program package 33 also includes a symbol editor 37 and a language editor 39. The user 2 will be able to view, create and edit the PLC application programs 22 from anywhere a browser 10 is available. A firewall or security for the programming device 21 maintained as part of its network interface prevents unauthorized users from accessing the program package 33.

In addition to providing the ability to edit the application programs 36 by providing a File Transfer Protocol (FTP) based view of the application programs 36, file backup and restore can be handled through standard programming tools, allowing the user to manage the application programs 36 directly and efficiently and to also use standard revision control software to manage the application programs 36. Further, since all the symbols can be stored within the programming device 21, any device capable of interfacing with the network 14, i.e., PDA, cell phone, etc., can be used to edit the application program 36. Alternatively, the comments and symbols can be stored on another network device, such as a PC, that is physically separated form the programming device 21.

Figure 5:
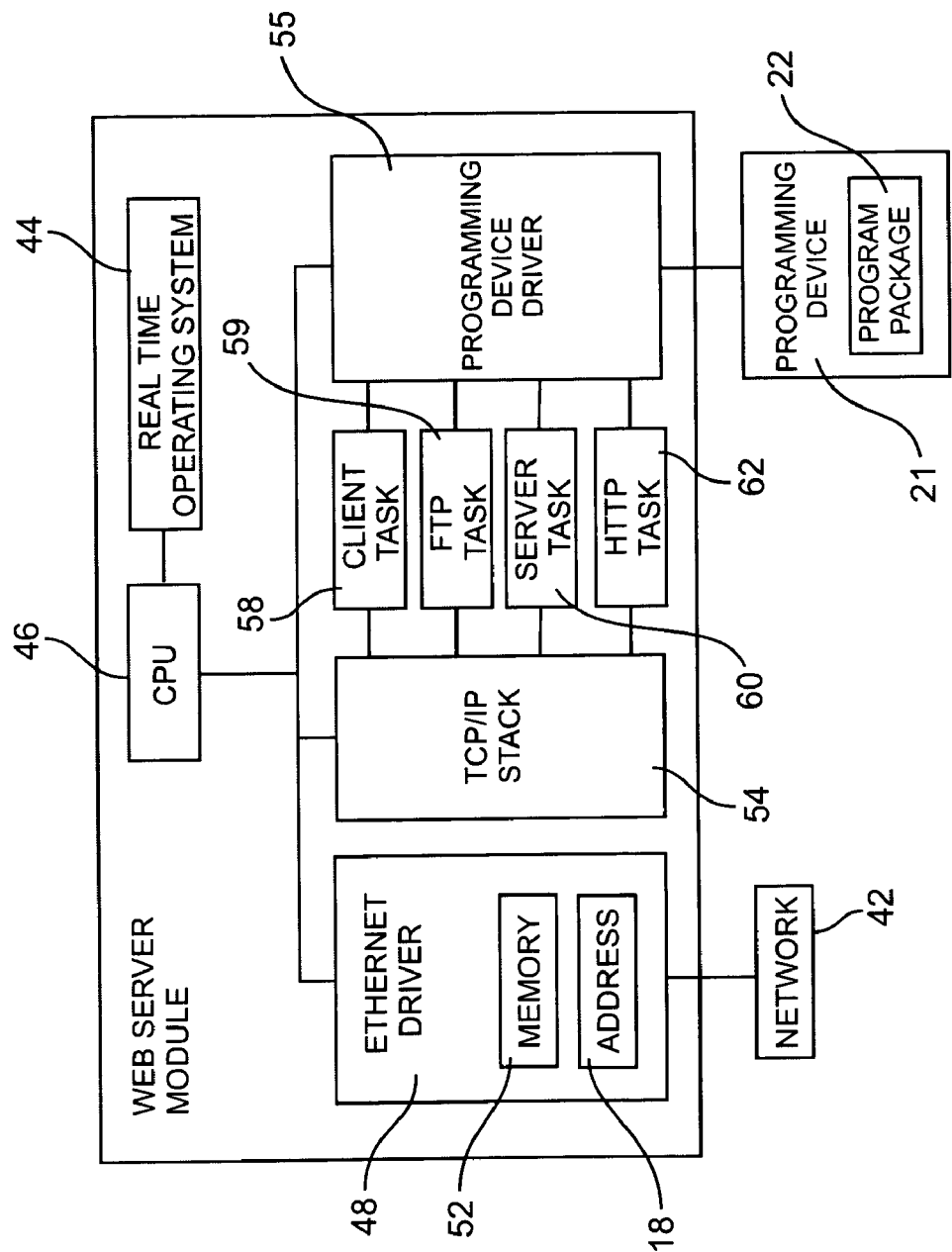
FIG. 5 is an alternative embodiment of the present invention.

FIG. 5 shows an alternative configuration wherein some or all of the components of the web site 4 reside on the PLC. This figure shows the components of a web server module for a PLC. The web server module is connected to the network 42 and is connected to the programming device 21. The programming device contains a program package for programming the PLC. Inside of the web server module is a CPU 46 that runs a real time operating system 44; Also running on the CPU 46 is an Ethernet driver 48, a TCP/IP stack 54, and a programming device driver 55. The TCP/IP stack 54 could also be a dual TCP/IP stack. Interfacing between the TCP/IP stack 54 and the programming device driver 55 are a number of tasks to perform various functions. There is a client task 58 and server task 60 that handles network communication. The FTP task 59 handles functionality required to respond to network requests or to create network requests that use the FTP protocol. The HTTP task 62 handles the functionality required to respond to or generate requests using the HTTP protocol. The Ethernet driver 48 contains a memory 52 and an address 18.

Figure 6:
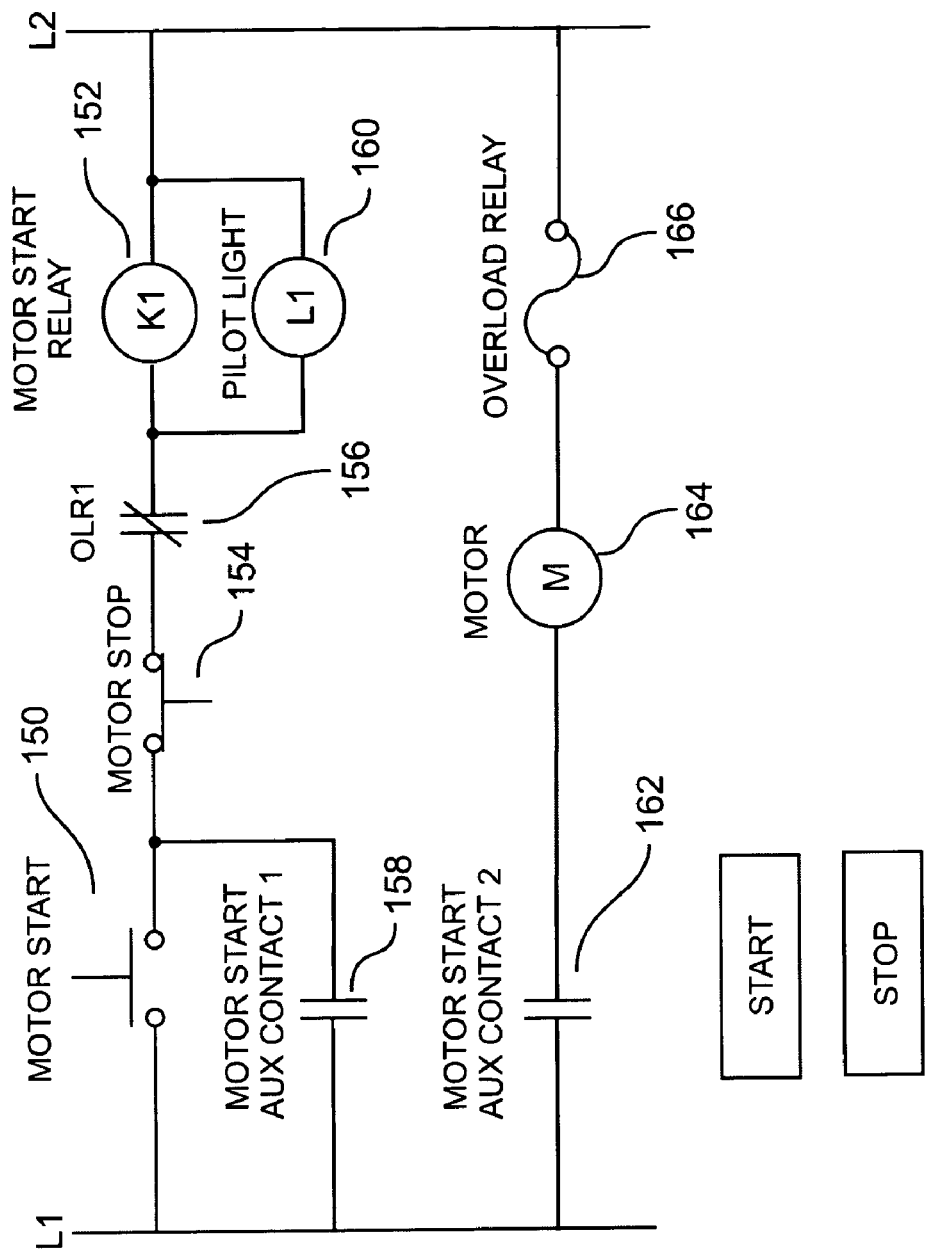
FIG. 6 is a mimic page of the operating program's ladder logic available to a user at a remote location utilizing a browser which illustrates the present invention for programming the application program controlling a factory automation device operably connected to a network.

A user at a remote location can edit the operating program of the PLC 32 by accessing a web page associated with the program package 33 via the Internet. A mimic page shown in FIG. 6, represents some of the hardware physically connected to the programmable logic controller system that can be constructed utilizing graphical editing techniques that are part of the present invention. The present invention allows a user at a remote location, using a browser, to create and edit a PLC operating program by adding and deleting various components illustrated in the mimic page. FIG. 6 shows a simple motor start-stop control in ladder logic diagram form that could be available as a mimic page to the user. The mimic page diagram will be accessed using a browser which will allow the user to view the graphic representing the operating program of the PLC 32. Rearranging the components on the mimic page will result in a different operating program. The program can be saved on the programming device 21 for later transfer to the PLC 32. Alternatively, the user can edit or create the PLC's operating program without using the graphic mimic page.

It is also to be understood by one of ordinary skill in the art that the communication network can comprise any combination of wired and wireless technology.

While the specific embodiments have been illustrated and described, numerous modifications are possible/without departing from the scope or spirit of the invention.

I claim:

1. A system for programming an application program controlling a factory automation controller on a communication network, comprising:
   a programming device operably connected to the communication network and remotely located from the factory automation controller;
   a program package embedded in the programming device, the program package for creating and editing the application program;
   at least one web page resident on the programming device and operably connected to the program package, wherein the web page is accessible to a user using a web browser to edit the application program controlling the factory automation controller, wherein the factory automation controller is graphically depicted in the web page, and,
   an interface module for operably connecting the programming device to the communication network.

2. The system of claim 1 wherein the web browser is resident within the programming device.

3. The system of claim 1 wherein the application program is viewed as an at least one file within the programming device, accessible on the communication network using a standard File Transfer Protocol.

4. The system of claim 1 wherein the application program is converted by the program package and viewed on the web browser through either Java or HTML.

5. The system of claim 1 wherein the factory automation device is a programmable logic controller.

6. The system of claim 1 wherein the communication network is Ethernet.

7. The system of claim 1 wherein the interface module includes:
   a real time operating system operating a central processing unit;
   a network interface for communicating with the communication network;
   a driver for communicating with the programming device;
   a protocol stack;
   a client task for communicating with the protocol stack for initiating received requests;
   a server task for communicating with the protocol stack for responding to received requests; and,
   a protocol task for communicating with the protocol stack for receiving and responding to protocol task requests.

8. The system of claim 7 wherein the communication network is a world-wide network known as the Internet using an Internet Protocol (IP).

9. The system of claim 8 wherein the interface module functions as a web site on the Internet, the interface module including a global IP address.

10. The system of claim 9 wherein the protocol stack is a Transmission Control Protocol stack and wherein the protocol task includes a server task using a hypertext transport protocol (HTTP) task to deliver hypertext documents to the network interface.

11. The system of claim 10 wherein the HTTP task accepts a connection, parses an HTTP request, and calls the real time operating system to process the request.

12. A system for programming an application program controlling a factory automation device on a communication network, comprising:
   a programming device operably connected to the communication network wherein the programming device is resident within the factory automation device;
   a program package embedded in the programming device, the program package for creating and editing the application program;
   at least one web page resident on the programming device and operably connected to the program package, wherein the web page is accessible to a user using a web browser to edit the application program controlling the factory automation device, wherein the factory automation device is graphically depicted in the web page.

13. A system for programming an application program controlling a factory automation device on a communication network, comprising:
   a programming device operably connected to the communication network;
   a program package embedded in the programming device, the program package for creating and editing the application program wherein the program package further includes a symbol editor and a language editor and wherein all symbols are stored within the programming device, allowing any authorized device coupled to the communication network to edit the application program;
   at least one web page resident on the programming device and operably connected to the program package, wherein the web page is accessible to a user using a web browser to edit the application program controlling the factory automation device, wherein the factory automation device is graphically depicted in the web page.

14. A system for programming an application program controlling a factory automation controller on a communication network, comprising:
   a programming device operably connected to the communication network;
   a program package embedded in the programming device, the program package for creating and editing the application program;
   at least one web page resident on the programming device and operably connected to the program package, wherein the web page is accessible to a user using a web browser to edit the application program controlling the factory automation controller, wherein the factory automation controller is an output module, wherein the factory automation controller is graphically depicted in the web page.

15. A system for programming an application program controlling a factory automation device on a communication network, comprising:
   a programming device operably connected to the communication network;
   a program package embedded in the programming device, the program package for creating and editing the application program;
   at least one web page resident on the programming device and operably connected to the program package, wherein the web page is accessible to a user using a web browser to edit the application program controlling the factory automation device;
   further including an interface module for operably connecting the programming device to the communication network wherein the interface module includes a dual TCP/IP stack for data transferring comprising a first stack capable of handling a broad range of TCP/IP messages and a second stack capable of handling a less broad range of TCP/IP messages more quickly than the first stack.

16. A system for programming an application program controlling a factory automation controller on a communication network, comprising:

means for coupling the factory automation controller to the communication network;

means for editing the application program resident in a programming device; and an at least one Web page resident in the programming device, the Web page linked to the editing means resident in the programming device, wherein the Web page is accessible to a user using a web browser coupled to the communication network through the coupling means, and wherein the Web page allows the user to access the editing means to edit the application program controlling the factory automation controller wherein the factory automation controller is graphically depicted in the Web page, and wherein the coupling means includes an interface module, the interface module including:

a real time operating system operating a central processing unit;

a network interface for communication with the communication network;

a driver for communicating with the programming device;

a protocol stack;

a client task for communicating with the protocol stack for initiating received requests;

a server task for communicating with the protocol stack for responding to received requests; and, a protocol task for communicating with the protocol stack for receiving and responding to protocol task requests.

17. The system of claim 16 wherein the web browser is resident within the programming device.

18. The system of claim 16 wherein the communication network is Ethernet.

19. The system of claim 16 wherein the application program is viewed as files within the programming device, accessible to the communication network using a standard File Transfer Protocol.

20. The system of claim 16 wherein the editing means includes a program package whereby the application program is converted by the program package and viewed as either Java or HTML.

21. The system of claim 16 wherein the communication network is a world-wide network known as the Internet using an Internet Protocol (IP).

22. The system of claim 21 wherein the interface module functions as a web site on the Internet, the interface module including a global IP address.

23. The system of claim 22 wherein the protocol stack is a Transmission Control Protocol stack and wherein the protocol task includes a server task using a hypertext transport protocol (HTTP) task to deliver hypertext documents to the network interface.

24. The system of claim 23 wherein the HTTP task accepts a connection, parses an HTTP request, and calls the real time operating system to process the request.

25. A system for programming an application program controlling a factory automation device on a communication network, comprising:

means for coupling the factory automation device to the communication network;

means for editing the application program resident in a programming device; and an at least one Web page resident in the programming device, the Web page linked to the editing means resident in the programming device, wherein the Web page is accessible to a user using a web browser coupled to the communication network through the coupling means, and wherein the Web page allows the user to access the editing means to edit the application program controlling the factory automation device, wherein the programming device is resident within the factory automation device, wherein the factory automation device is graphically depicted in the Web page.

26. A system for programming an application program controlling a factory automation device on a communication network, comprising:

means for coupling the factory automation device to the communication network;

means for editing the application program resident in a programming device located remotely from the factory automation device; and an at least one Web page resident in the programming device, the Web page linked to the editing means resident in the programming device, wherein the Web page is accessible to a user using a web browser coupled to the communication network through the coupling means, and wherein the Web page allows the user to access the editing means to edit the application program controlling the factory automation device, wherein the program package further includes a symbol editor and a language editor wherein all symbols are stored within the programming device, allowing any authorized device coupled to the communication network to edit the application program.

27. A system for programming an application program controlling a factory automation device on a communication network, comprising:

means for coupling the factory automation device to the communication network, wherein the coupling means includes an interface module, the interface module including a dual TCP/IP stack for data transferring comprising a first stack capable of handling a broad range of TCP/IP messages and a second stack capable of handling a less broad range of TCP/IP messages more quickly than the first stack;

means for editing the application program resident in a programming device; and an at least one Web page resident in the programming device, the Web page linked to the editing means resident in the programming device, wherein the Web page is accessible to a user using a web browser coupled to the communication network through the coupling means, and wherein the Web page allows the user to access the editing means to edit the application program controlling the factory automation device.

28. A method of programming an application program for controlling a factory automation controller operably connected to a communication network, the method comprising the steps of:

providing a programming device located remotely from the factory automation controller for accessing the application program;

viewing the application program using a web browser operably connected to the programming device, wherein the web browser graphically depicts a symbol representing the factory automation controller;

editing the application program via a program package resident in the programming device, and transferring the application program to the factory automation device.

29. The method of claim 28 wherein the web browser is resident within the programming device.

30. The method of claim 28 wherein the application program is viewed as an at least one file within the programming device, accessible on the communication network using a standard File Transfer Protocol.

31. The method of claim 30 wherein the application program is converted by the program package and viewed on the web browser through either Java or HTML.

32. The method of claim 28 wherein the factory automation device is a programmable logic controller.

33. The method of claim 28 wherein the factory automation device is an output module.

34. The method of claim 28 wherein the communication network is Ethernet.

35. The method of claim 28 further including an interface module for operably connecting the programming device to the communication network.

36. The method of claim 35 wherein the interface module includes:
  a real time operating system operating a central processing unit;
  a network interface for communicating with the communication network;
  a driver for communicating with the programming device;
  a protocol stack;
  a client task for communicating with the protocol stack for initiating received requests;
  a server task for communicating with the protocol stack for responding to received requests; and
  a protocol task for communicating with the protocol stack for receiving and responding to protocol task requests.

37. The method of claim 36 wherein the communication network is a world-wide network known as the Internet using an Internet Protocol (IP).

38. The method of claim 37 wherein the interface module functions as a web site on the Internet, the interface module including a global IP address.

39. The method of claim 38 wherein the protocol stack is a Transmission Control Protocol stack and wherein the protocol task includes a server task using a hypertext transport protocol (HTTP) task to deliver hypertext documents to the network interface.

40. The method of claim 39 wherein the HTTP task accepts a connection, parses an HTTP request, and calls the real time operating system to process the request.

41. A method of programming an application program for controlling a factor automation device operably connected to a communication network, the method comprising the steps of:
  providing a programming device for accessing the application program, wherein the programming device is resident within the factory automation device;
  viewing the application program using a web browser operably connected to the programming device wherein the web browser graphically depicts a symbol representing the factory automation device; and
  editing the application program via a program package resident in the programming device.

42. A method of programming an application program for controlling a factory automation device operably connected to a communication network, the method comprising the steps of:
  providing a programming device located remotely from the factory automation device for accessing the application program;
  viewing the application program using a web browser operably connected to the programming device; and
  editing the application program via a program package resident in the programming device wherein the program package further includes a symbol editor and a language editor and wherein all symbols are stored within the programming device, allowing any authorized device coupled to the communication network to edit the application program.

43. A method of programming an application program for controlling a factory automation device operably connected to a communication network, the method comprising the steps of:
  providing a programming device for accessing the application program that includes an interface module for operably connecting the programming device to the communication network wherein the interface module further includes a dual TCP/IP stack for data transferring comprising a first stack capable of handling a broad range of TCP/IP messages and a second stack capable of handling a less broad range of TCP/IP messages more quickly than the first stack;
  viewing the application program using a web browser operably connected to the programming device; and
  editing the application program via a program package resident in the programming device wherein the interface module further includes a dual TCP/IP stack for data transferring comprising a first stack capable of handling a broad range of TCP/IP messages and a second stack capable of handling a less broad range of TCP/IP messages more quickly than the first stack.

* * * * *